(12) United States Patent
Schreier et al.

(10) Patent No.: US 6,742,779 B2
(45) Date of Patent: Jun. 1, 2004

(54) AUTOMATIC DOCUMENT TRANSPORT METHOD AND DEVICE USING SUCTION TO RETAIN UNFED DOCUMENTS DURING FEEDING

(75) Inventors: Susanne Schreier, Oldenburg (DE); Jürgen Blanke, Delmenhorst (DE)

(73) Assignee: DRS Digitale Repro Systeme GmbH, Duisburg (DE)

(*) Notice: Subject to any disclaimer, the term of this patent is extended or adjusted under 35 U.S.C. 154(b) by 190 days.

(21) Appl. No.: 10/009,412

(22) PCT Filed: Feb. 28, 2001

(86) PCT No.: PCT/DE01/00782

§ 371 (c)(1),
(2), (4) Date: Dec. 10, 2001

(87) PCT Pub. No.: WO01/77750

PCT Pub. Date: Oct. 18, 2001

(65) Prior Publication Data

US 2003/0074104 A1 Apr. 17, 2003

(30) Foreign Application Priority Data

Apr. 11, 2000 (DE) .......................................... 100 17 989
Nov. 7, 2000 (DE) .......................................... 100 55 159

(51) Int. Cl.[7] .............................. B65H 3/34; B65H 3/64
(52) U.S. Cl. ...................... 271/104; 271/102; 271/107; 271/167; 414/797; 414/903
(58) Field of Search ................................ 271/102, 104, 271/107, 169, 167; 414/797, 903

(56) References Cited

U.S. PATENT DOCUMENTS

| | | | | | |
|---|---|---|---|---|---|
| 3,260,520 A | * | 7/1966 | Sugden | ......................... | 271/94 |
| 3,782,716 A | * | 1/1974 | Long et al. | ................... | 271/99 |
| 3,844,551 A | * | 10/1974 | Morrison | ..................... | 271/99 |
| 4,186,918 A | * | 2/1980 | Ficker et al. | ............... | 271/232 |
| 4,359,314 A | * | 11/1982 | Hellmer | ..................... | 425/503 |
| 4,694,719 A | * | 9/1987 | Levene et al. | ................ | 83/451 |
| 4,747,005 A | * | 5/1988 | Seki | ........................ | 360/98.03 |
| 5,050,853 A | * | 9/1991 | LaVos et al. | ................. | 271/98 |
| 5,465,951 A | * | 11/1995 | Burt et al. | ................... | 271/167 |
| 5,520,380 A | * | 5/1996 | Martin et al. | ................ | 271/94 |
| 5,806,845 A | * | 9/1998 | Burt et al. | ................... | 271/167 |
| 2002/0185806 A1 | * | 12/2002 | Dettman et al. | ............ | 271/104 |

FOREIGN PATENT DOCUMENTS

| | | | | |
|---|---|---|---|---|
| DE | 2 043 738 | | 4/1971 | |
| DE | 2144851 | * | 6/1972 | ................ 271/104 |
| DE | 33 13 615 | | 10/1986 | |
| DE | 31 32 393 | | 10/1992 | |
| DE | 198 46 899 | | 5/2000 | |
| EP | 0 887 181 | | 12/1998 | |
| EP | 0 944 235 | | 9/1999 | |
| JP | 54-115865 | * | 9/1979 | ................ 271/104 |
| JP | 55-140440 | * | 11/1980 | .................... 271/5 |
| WO | 88/04676 | * | 6/1988 | ............. C08J/9/38 |
| WO | 91 16662 | | 10/1991 | |

* cited by examiner

Primary Examiner—Donald P. Walsh
Assistant Examiner—Daniel K Schlak
(74) Attorney, Agent, or Firm—Collard & Roe, P.C.

(57) ABSTRACT

In connection with a method for automatically inserting documents to be displayed on a display device and/or copied in a digitizing device, such as microfiches, microfilm jackets or the like, in which process one document at a time is transported from a stack of documents to be processed to a document support and from there to a deposit magazine for the processed documents, provision is made according to the invention that the top document of a stack of documents contained in the holding magazine is pulled up by suction to about the level of the document support and the remaining stack is subsequently retained by suction acting in the opposite direction; the document pulled up by suction is transported sideways to the document support, and deposited on said support by terminating the suction effect, and the document is then picked up by suction again after it has been processed, and is transported to the deposit magazine.

25 Claims, 9 Drawing Sheets

AUTOMATIC DOCUMENT TRANSPORT METHOD AND DEVICE USING SUCTION TO RETAIN UNFED DOCUMENTS DURING FEEDING

CROSS REFERENCE TO RELATED APPLICATIONS

Applicants claim priority under 35 U.S.C. §119 of German Application Nos. 100 17 989.4, filed on Apr. 11, 2000, and 100 55 159.9, filed on Nov. 7, 2000. Applicants also claim priority under 35 U.S.C. §120 of PCT/DE01/00782, filed on Feb. 28, 2001. The international application under PCT article 21(2) was not published in English.

BACKGROUND OF THE INVENTION

1. Field of the Invention

The invention relates to a method for automatically inserting documents such a microfiches, microfilm jackets or the like to be displayed on a display device and/or copied in a digitizing device. In this method, documents are conveyed one at a time from a holding magazine from a stack of documents to be processed to a document support, and from there to a deposit magazine for the processed documents. The invention, furthermore, relates to a device for carrying out the method.

2. The Prior Art

In light of the fact that the amount of documents that has to be digitized for more comfortable handling and for space reasons in companies, administrative offices and hospitals has grown in the course of time, the time factor plays an important role in connection with the digitizing and filing of such documents.

A commonly employed method for said purpose is to insert the documents individually under the digitizing device by hand and to remove them again manually after they have copied and digitized.

Due to the complicated handling of the documents during feeding, for example when processing microfilm jackets, a put-through of only 30 to 60 jackets per hour can be achieved, which means that new jackets would have to be continually inserted by hand at about 1- to 2-minute intervals. This requires the constant presence of a person while the digitizing device is being operated.

Patent application 198 46 899.7 describes an automated method and a device adapted to said method. It is possible with the help of said method and device to significantly increase the processing speed. The device described in said patent operates with purely mechanical means, which makes the device susceptible to trouble and maintenance-intensive.

SUMMARY OF THE INVENTION

Therefore, the invention is based on the problem of controlling or designing a method and a device of the type specified above in such a manner that the expenditure in terms of engineering expenditure remains low; that only a few moving parts are present; and that a reliable mode of operation is achieved nonetheless.

The invention solves this problem in that the top document is lifted up by suction from a stack of documents contained in a holding magazine, to about the level of the document support, and the remaining stack is subsequently kept in the holding magazine by suction in the opposite direction; the document pulled up by suction is then transported to the document support sideways and deposited on the document support by cancelling the suction effect. After the document has been processed, it is lifted up again by suction and transported to the deposit magazine.

A possible way of controlling the method is represented by the following sequence:

The holding magazine is filled.

No document is present on the document support.

The deposit magazine is emptied.

The pump generating the suction effect is shut off.

The suction element is positioned above the filled magazine, while the depositing element is positioned above the still-empty deposit magazine.

The suction device is started.

At least one document is lifted from the stack by suction.

This causes the vacuum to rise and a limit pressure valve is opened.

Any other document that may adhere to the document is removed and sucked back into the magazine; the remaining stack is retained.

The vacuum is controlled down to a lower value.

The document lifted by suction is displaced sideways to the document support.

The suction device is shut off (so that the vacuum will rapidly break down; either a bypass valve is opened and the outlet side of the suction device is briefly closed, or the drive of the suction device is slowed down electrically or mechanically).

The vacuum breaks down; the document drops onto the document support.

The document is digitized.

Following digitizing, the document is lifted from the document support by suction effect as well and transported to the deposit magazine.

Simultaneous with the lifting of the digitized document from the document support, the next document is collected from the holding magazine by suction.

According to a preferred way of controlling the method, in connection with which the limit pressure valve and the second conveyor means transporting the processed document from the document support to the deposit magazine are omitted, the operational sequence is as follows:

The holding magazine is filled.

No document is present on the document support.

The deposit magazine is emptied.

The transport means lifting the document by suction is positioned on top of the filled magazine.

The suction device located in the transport means is started.

At least one document is lifted from the stack by suction.

The suction openings in the transport means are closed, which either actuates a microswitch arranged within the zone of said suction openings, said microswitch generating a signal for cancelling the return suction effect (such a sensor may be located also in another site).

The documents lifted by suction is displaced sideways to the document support.

The suction device in the transport means is shut down.

The vacuum breaks down; the document drops onto the document support.

The transport means is driven away from the document support sideways.

The document is digitized.

Following digitizing, the document is again picked up from the document support by the transport means and transported to the deposit magazine.

After the transport means has ejected the processed document into the deposit magazine, it drives back into the original position above the holding magazine and the sequence starts anew.

A device according to a preferred embodiment is employed in connection with this second variation of the method. This device is characterized in that the plane board provided with the suction openings is part of a housing that is displaceable on guides and divided in two part areas by means of a partition wall, whereby one of the part areas is arranged located above the suction openings and can be evacuated by means of a suction blower arranged in the second part area, whereby the second part area has an opening that is aligned with an opening in the holding magazine so that the air aspirated from the first part area is received in the double-walled bottom part of the holding magazine.

This means that as long as no document adheres to the plane board, covering the suction openings located there, the air moved by the suction blower circulates through the openings in the double-walled bottom area that are aligned with each other, and from there through the openings in the side walls of the magazine and then through the suction openings in the plane board to the suction blower.

Now, when a document engaged by suction adheres to said plane board, the suction openings are closed and the flow of air is interrupted.

A second suction blower located in the bottom zone of the holding magazine is now activated, causing the inner cavity in the holding magazine to be evacuated, so that the remaining stack present in the container is retained and only one single document actually adheres to the plane board of the transport means. As stated above, provision may be made in the plane board for a microswitch serving as the means for triggering the second suction blower, said microswitch being pressed through the document engaged by suction.

Such a microswitch, furthermore, offers the advantage that the document is actively repelled by spring force of said microswitch, which supports the effect of gravity.

A second possibility for triggering the second suction blower is to make provision in the flow of air of the first suction blower for a microswitch that is deflectable against the force of a spring. Said microswitch pivots back into its switching position when the flow of air is interrupted as a document is being engaged by suction.

The aspirated document is deposited on a document support which, according to a further embodiment, preferably comprises a framework corresponding with the document. A glass panel covering the document is pivot-mounted on this frame.

The glass panel needs to be arranged on the frame only when required because it is not absolutely required when microfiches are digitized, but needed for digitizing microfilm jackets.

According to a further embodiment, the frame consists of hollow profiles, whereby the profile walls disposed on the inner side have openings at their ends pointing at the document, and the cavities in the hollow profiles can be evacuated. The profile walls of the frame disposed on the inner side have a defined inclination, so that when the document to be digitized drops down, a self-centering effect is achieved. As soon as the document is positioned in the frame, the cavities of the frame are evacuated, so that a vacuum is generated below the document that flatly presses the document against the support.

As stated above, the vacuum suffices for completely pressing a microfiche plane against the support without the need of having to place a glass panel on the microfiche.

When a microfilm jacket is processed, the application of the vacuum causes the underside of the microfilm jacket to be pressed against the support. However, the pocket-shaped receiving strips for receiving the document do not possess such planeness, so that it is necessary in this case to additionally attach a glass panel.

After the digitizing process has been completed, the glass panel is swiveled away upwards. The vacuum below the document is still maintained so that the document cannot remain adhered to the glass panel driving up.

As soon as the glass panel has been swiveled away to the rear, the transport means drives on top of the document support and engages the digitized document by suction. On the way to the holding magazine, the transport means ejects the documents above the deposit magazine. According to claim 20, the deposit magazine is located on the bottom of a housing that is provided with an opening at its upper side corresponding with the dimensions of the document. A guide means is extending from said opening to the deposit magazine. Said guide means is designed in such a way that the document dropping through the opening describes a path turning the document by 180°.

According to a further embodiment, the glass panel flattening the documents is secured with play on two U-shaped cantilevered arms. The cantilevered arms can be pivoted by means of an electric motor, swiveling from the covering position to a release position. The U-shaped cantilevered arms extend beyond the profile of one side of the frame of the document support. A driving means is secured on the shaft of the electric motor. During rotation, the driving means takes along a pin secured on one of the cantilevered arms, thereby causing the glass plate secured on the cantilevered arms to be pivoted upwards.

This construction has the advantage that the glass panel can be pivoted upwards by hand as well without actuating the motor.

The glass panel must not be supported in any rigid manner so as to assure that it will always rest plane on the document in each case.

According to a further embodiment, the glass panel is secured on the cantilevered arms by means of a ribbon that is adhesive on both sides. This adhesive ribbon is elastic and acts like another bearing permitting a smaller angular clearance. The bearings of the cantilevered arms have a certain play as well.

In addition, near the adhesive connection, the cantilevered arms may comprise an additional joint permitting a clearance of a few angular degrees.

According to a further embodiment, the deposit magazine is arranged located between the holding magazine and the document support. This results in shorter distances for the transport means to travel.

However, it is possible also, according to a further embodiment, that the document support is arranged between the holding magazine and the deposit magazine. Especially in connection with such an embodiment, provision is made according to a further embodiment that a second transport means is provided for transporting the document from the document support to the deposit magazine. The second transport means is capable of pivoting by an angle of about 150° anticlockwise, and by about 210° clockwise, in a plane extending perpendicular to the plane of the document support. The advantage of such an embodiment lies in that as the processed document is being picked up by said second transport means, the first transport means is capable of engaging by suction a new document for digitizing.

The second transport means pivots the document it has picked up by suction in such a manner that it comes to rest in a slanted plane. When the suction effect is cancelled, the document can then slide from there into the deposit magazine under the influence of gravity, coming to rest in the deposit magazine turned by 180° in relation to its starting position. As also in connection with the first alternative, what is achieved in this way is that the processed documents can be collected again from the deposit magazine in the same sequence, i.e. the documents are deposited in the deposit magazine in the same order as in the holding magazine.

According to a further embodiment, in the course of the pivoting movement of the second transport means, slots provided in the pivot guide open and then connect the suction opening or openings in the board with the suction device or separate such opening(s) from the latter.

In connection with a transport means of the last-mentioned type, it is possible to primarily establish a connection with the atmosphere by way of closable openings positioned above the suction openings in the transport means. The release of the document from the slanted board of the transport means is supported and facilitated in this way by the effect of gravity.

With all variations of the invention, it is absolutely necessary for the "separation" function for separating the documents in the holding magazine that a gap is available between the board provided with the suction openings and the top edges of the side parts of the holding magazine. Without such a gap, it is not possible to remove another document—which may adhere to the first document previously engaged by suction—by suction in the opposite direction. The width of the gap can be set by means of elevations provided on the top edges of the side parts. Such elevations may serve at the same time as guides for displacing the board sideways.

However, it is preferred that provision is made that such gap areas are produced, for example by wheels on which the transport means can be driven. The wheels are dimensioned in such a way that the bottom clearance of the transport means is adequate for producing the gap.

BRIEF DESCRIPTION OF THE DRAWINGS

The invention is explained in greater detail in the following with the help of drawings, in which.

DETAILED DESCRIPTION OF PREFERRED EMBODIMENTS

Figure 1:
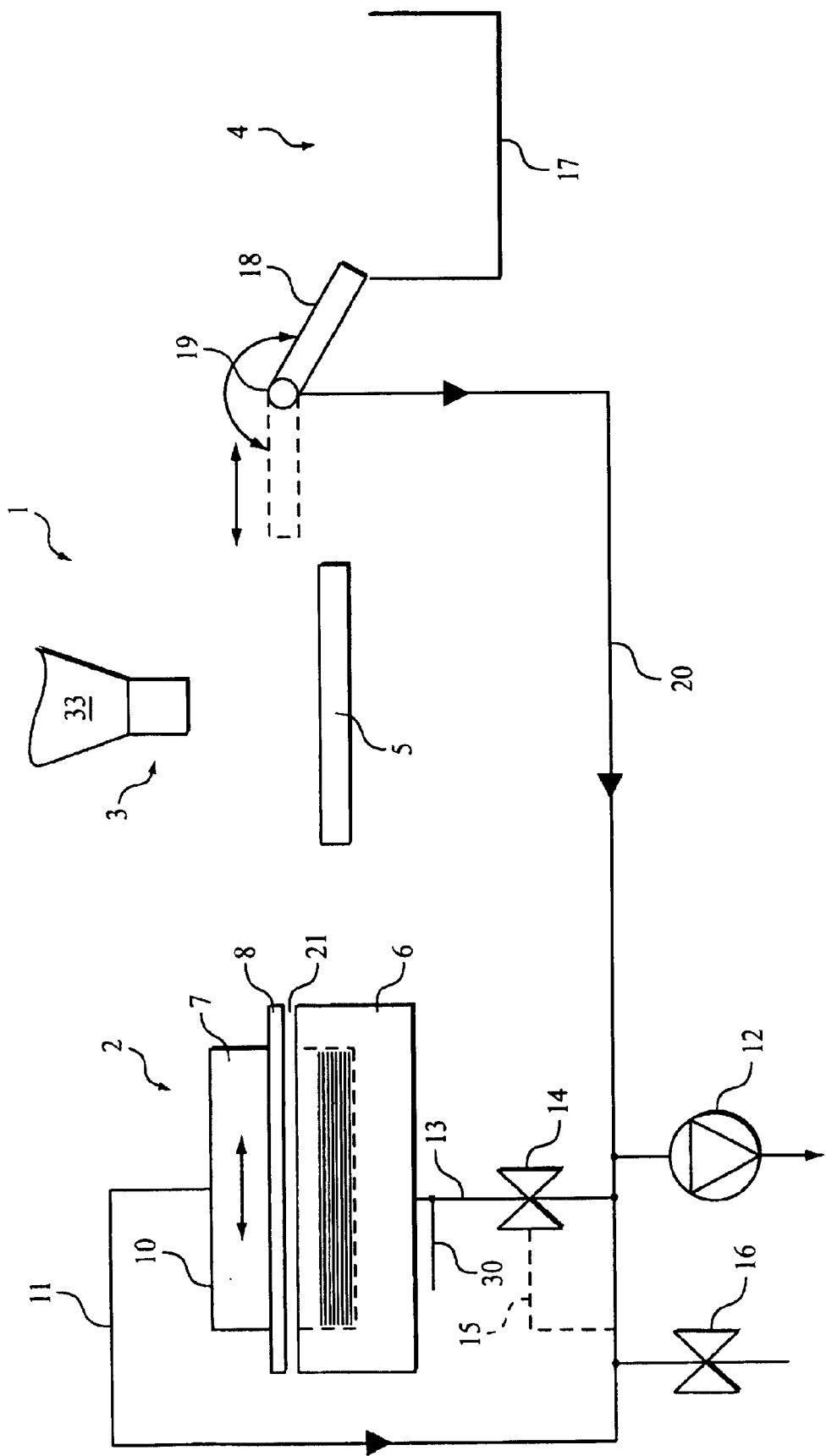
FIG. 1 shows the basic structure of a first variation of the invention.

FIG. 1 basically represents a device for digitizing documents such as microfiches, microfilm jackets or the like. The device is generally denoted by reference numeral 1.

Device 1 substantially comprises three components, notably the document feed system 2, the actual digitizing device 3, which, however, is only indicated, and the document discharge system 4. Diqitizing device 3 comprises digitizer 33 and a document support 5.

Document feed system 2 comprises a holding magazine 6 and a transport means 7 arranged above magazine 6. Transport means 7 picks up the document from holding magazine 6 and drives sideways on top of document support 5, on which the document is then deposited.

Figure 2:
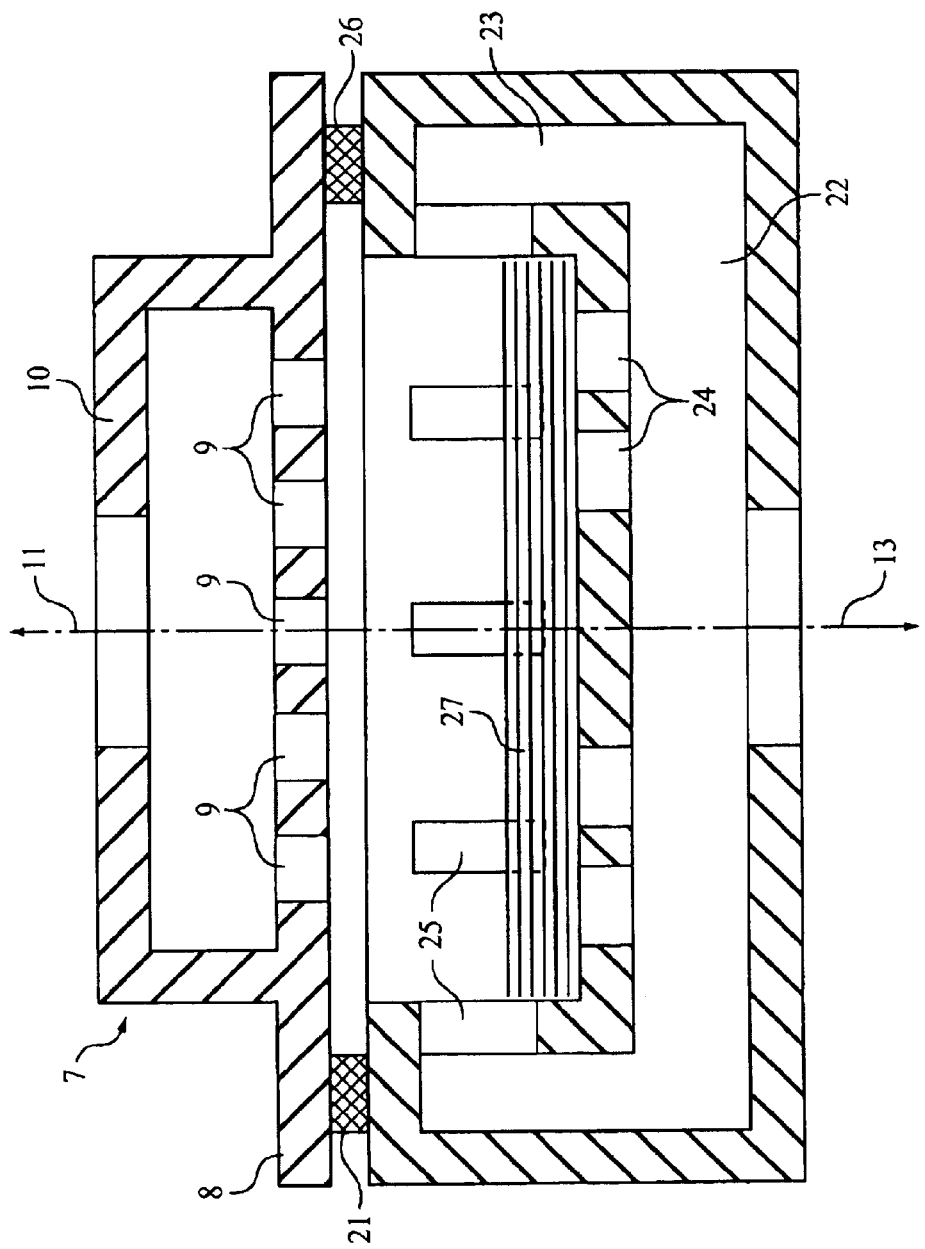
FIG. 2 is a sectional view of the holding magazine with the transport means arranged thereon, in a first embodiment according to variation 1.
Figure 3:
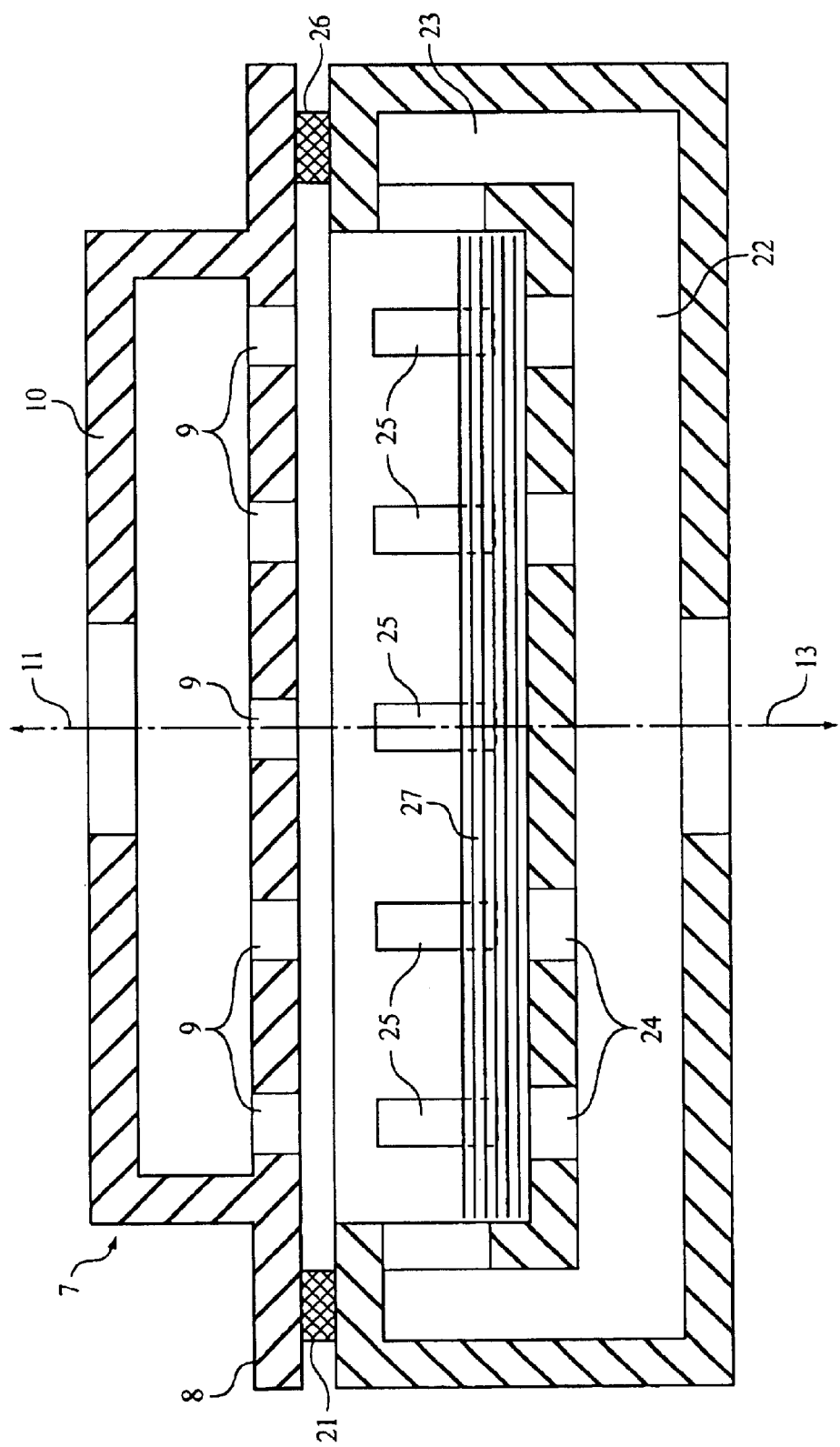
FIG. 3 shows the arrangement according to FIG. 2 in a second embodiment according to variation 1.

Holding magazine 6 is shown in greater detail in FIGS. 2 and 3. Transport means 7 comprises a plane board 8, in which provision is made for the suction openings 9. Suction openings 9 feed into a box-shaped chamber 10, which is arranged on board 8. A line 11 consisting of a flexible hose is connected with the upper wall of box 10 and leads to a vacuum pump 12. Another line 13 also consisting of a flexible hose is connected in the bottom of holding magazine 6 and connected to vacuum pump 12 as well. A limit pressure valve 14 is arranged in line 13. So as to assure that the document is engaged by suction, a connection is provided leading from line 13 to the environment. Such a connection can be established in the form of a permanently open bypass line 30 located above valve 14. Alternatively, valve 14 can be designed so that when line 13 is not connected with the line 20 (at low or no vacuum), line 13 is connected with the environment via an additional connection. When valve 14 connects lines 13 and 20 (at high vacuum), the connection of line 13 to the environment is closed. A bypass line 15 with a bypass valve 16 leads from limit pressure valve 14 to the line 11. Discharge device 4 comprises a deposit magazine 17 as well as another transport means 18, which may consist of a board-like element as well, in which provision is made for at least one suction opening. Board 18 is pivot-mounted, swinging about the axle of rotation 19. The suction opening provided in board 18 is connected with vacuum pump 12 via openings (not shown) located in the zone of rotary axle 19 and via a line 20 consisting of a flexible hose. When board 18 is in the position shown by dashed lines, the openings in the zone of rotary axle 19 are open, whereas they are closed when the board is in the position indicated by the fully drawn lines.

When in the position indicated by the dashed lines, board 18 is displaced sideways over document support 5. However, board 18 can be arranged also so that the position above document support 5 is assumed by displacing the board from the position shown by the fully drawn lines into the position indicated by the dashed lines solely by means of the swiveling motion.

Furthermore, a closable opening is provided in the board 18.

The operational sequence is explained with the help of FIG. 1 as follows:

The holding magazine 6 is filled with a stack of documents. The limit pressure valve 14 and the bypass valve 16 are closed. The transport means 7 is positioned above the holding magazine. A gap 21 is present between the board 8 of the transport 7 and the top edge of the holding magazine 6. The top document in the holding magazine 6 is engaged by suction by the transport means 7 and closes the suction openings 9 as it is being picked up. The limit pressure valve 14 is now opened. The stack of documents remaining in the holding magazine 6 is engaged by suction and any other documents that might possibly adhere to the document being picked up by suction are engaged by suction at the same time. The vacuum is controlled down to a lower value. The transport means with the document adhering to it is displaced sideways over the document support 5. The vacuum pump is shut off. So that the vacuum is cancelled rapidly and the document can drop onto the document support 5, the bypass valve 16 is opened. Alternatively, it is possible also to briefly close the blow-off side of the vacuum pump, or the motor of the vacuum pump can be braked electrically or mechanically.

After the document has been placed on the document support 5, the transport means 7 drives back into its starting position. The document is now digitized in the digitizing device 3. After the digitizing process has been completed, the transport means 18 drives on top of the document support 5. The openings within the zone of rotation 19 of the board 19 are opened, which establishes the connection with the vacuum pump. By swiveling the board 18 by about 210° clockwise, the board 18 is laterally received on the deposit magazine 17. The openings within the zone of rotation 19 of the board are closed again by the swiveling movement and the additional opening provided in the board 18 is opened, so that a pressure compensation with the environment occurs. The document automatically slides into the deposit magazine 17.

As the document is being attached by suction to the board 18 from the document support 5, the next document is picked up by suction by the transport means 7 at the same time while the limit pressure valve 14 and the bypass valve 16 are being closed, and the operational sequence of the process is repeated as described above.

Owing to the fact that the board 18 is pivoted after the suction process by approximately 210° clockwise, the documents are received in the deposit magazine in the correct sequence, but turned by 180°.

FIGS. 2 and 3 show two exemplified embodiments of holding magazine 6 with associated transport means 7. Holding magazine 6 comprises a container with a double-walled bottom part 22 and the side parts 23, which are double-walled as well. Provision is made for the openings 24, 25 both in the inner wall of bottom part 22 and in the inner wall of side parts 23, whereby openings 25 in the side parts can be closed.

The elevations 26 are attached to the top edges of side parts 23. Elevation 26 serve for creating the gap 21 between holding magazine 6 and board 8 of transport means 7.

The closable openings 25 in the area of the inner walls of the side parts 23 serve for optimizing the flow conditions when the top document is picked up by suction from the document stack 27 (openings 25=closed), as well as when sucking back documents adhering to the documents lifted by suction (openings 25=opened).

The representations in FIGS. 2 and 3 are different only on account of the dimensions of the elements described above and are therefore denoted by the same reference numerals.

Figure 4:
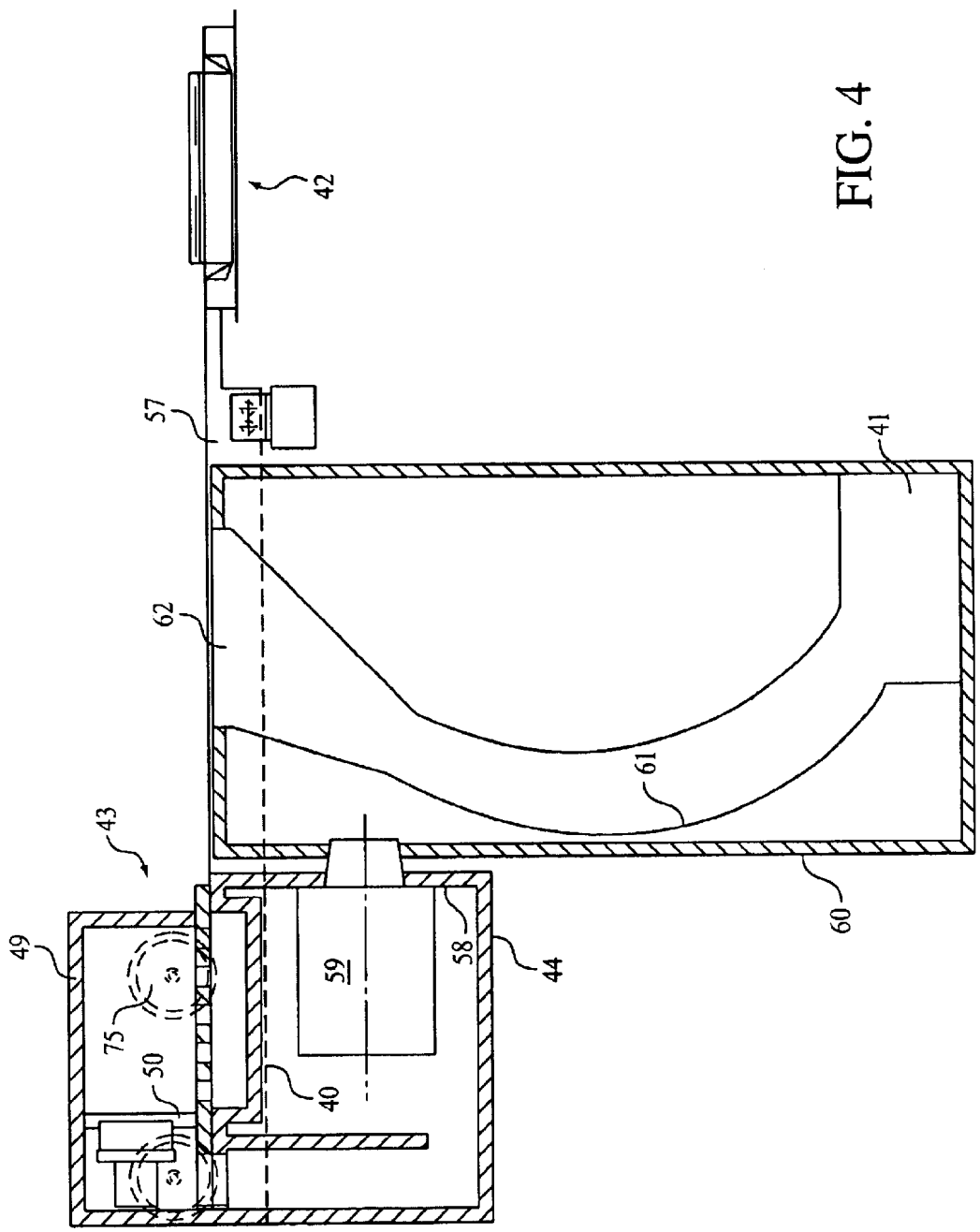
FIG. 4 shows a second variation of the device.

FIG. 4 shows a preferred embodiment of the device as defined by the invention.

Figure 5:
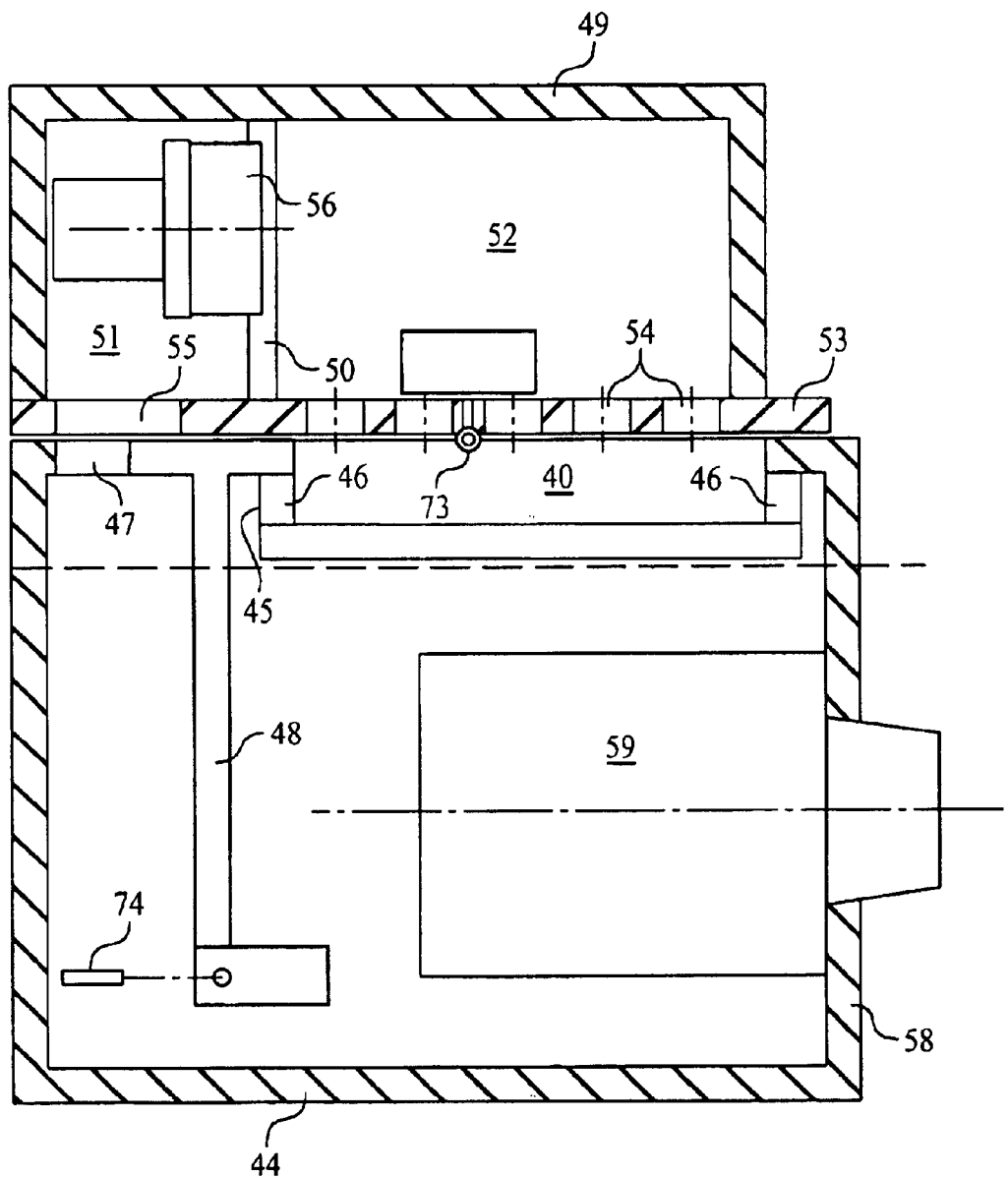
FIG. 5 is a sectional view of the holding magazine with the transport means positioned on top of the magazine.
Figure 6:
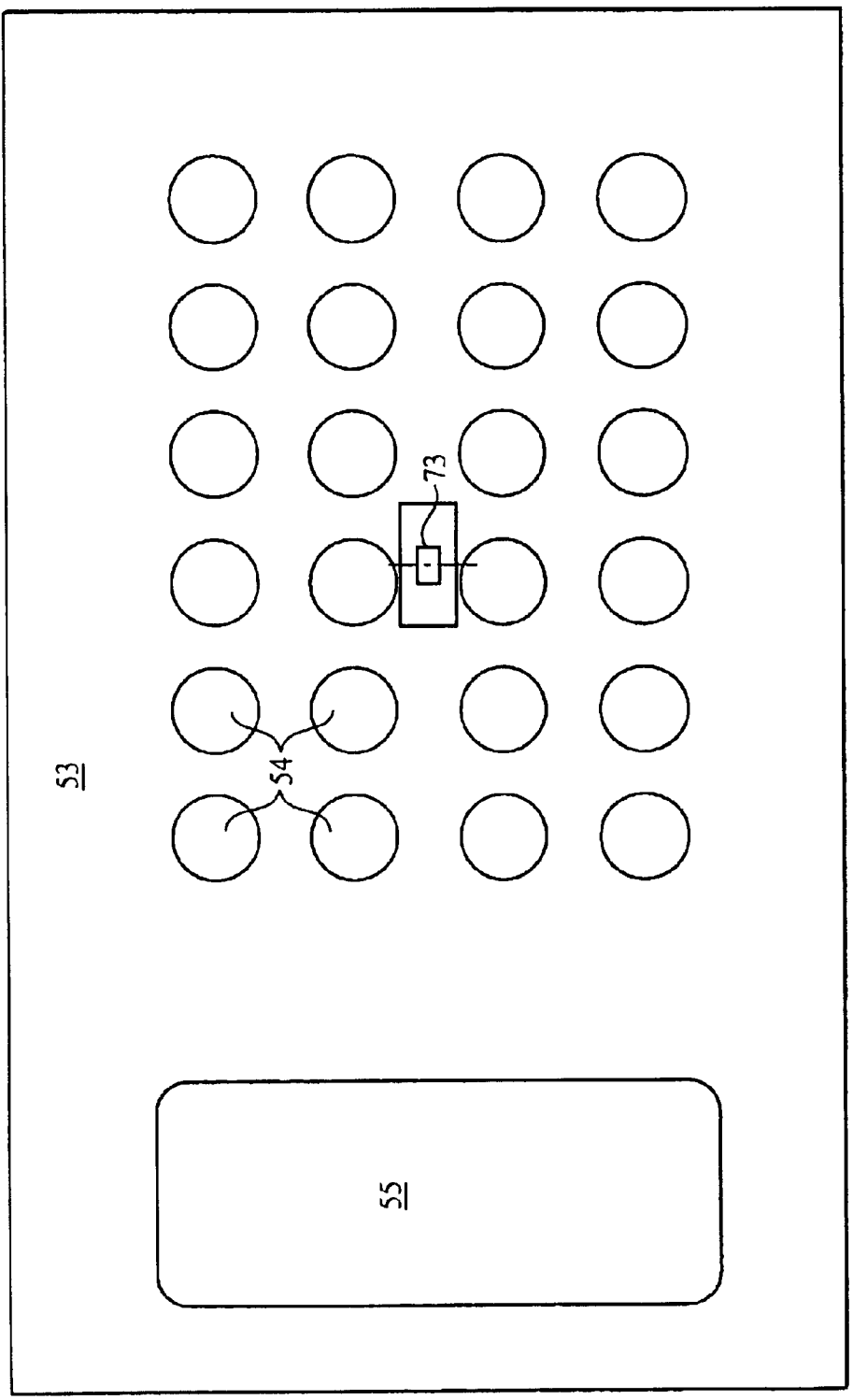
FIG. 6 shows the bottom plate of the transport means with suction openings.
Figure 7:
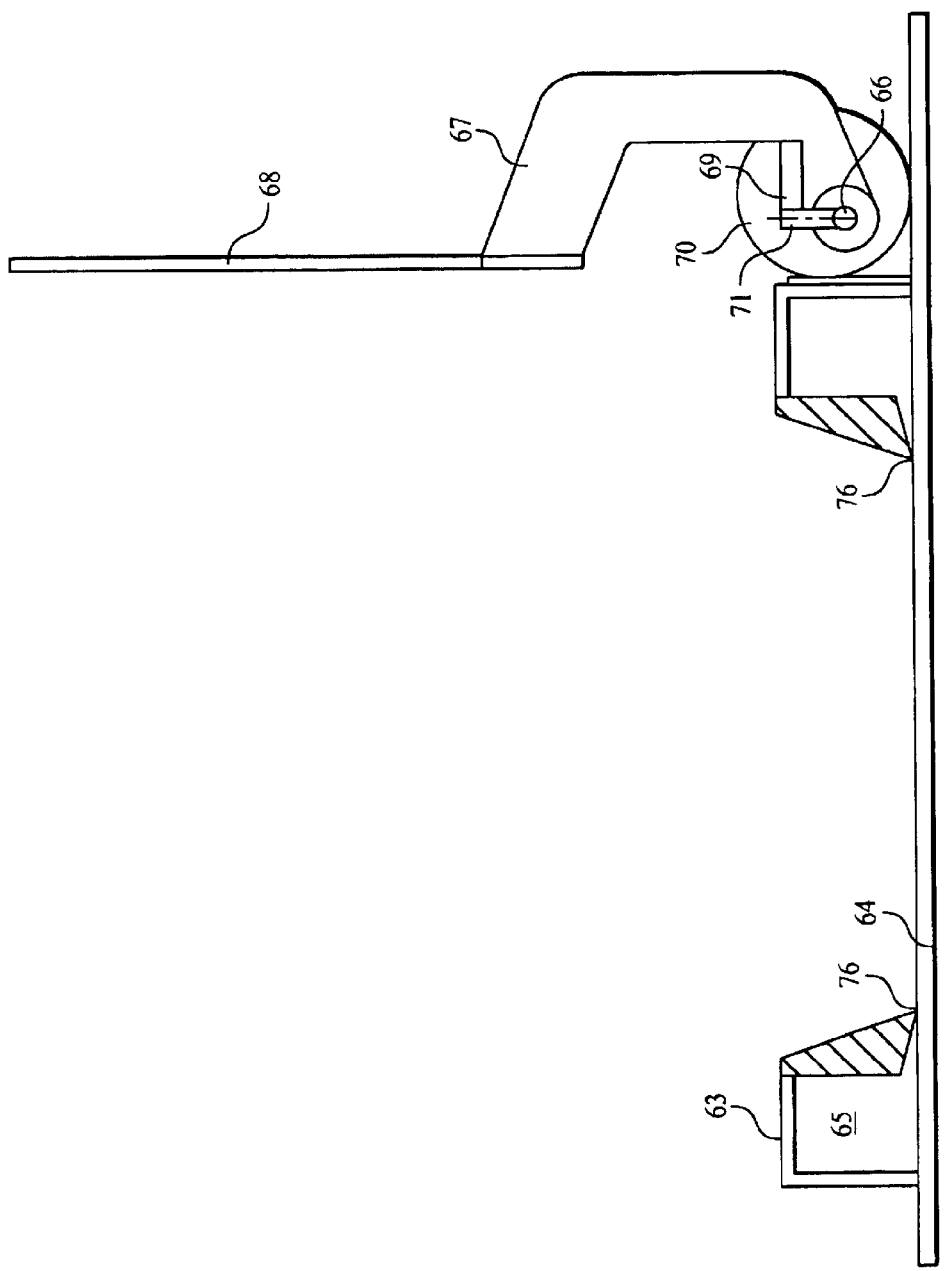
FIG. 7 is a partly sectional side view of a document support.
Figure 8:
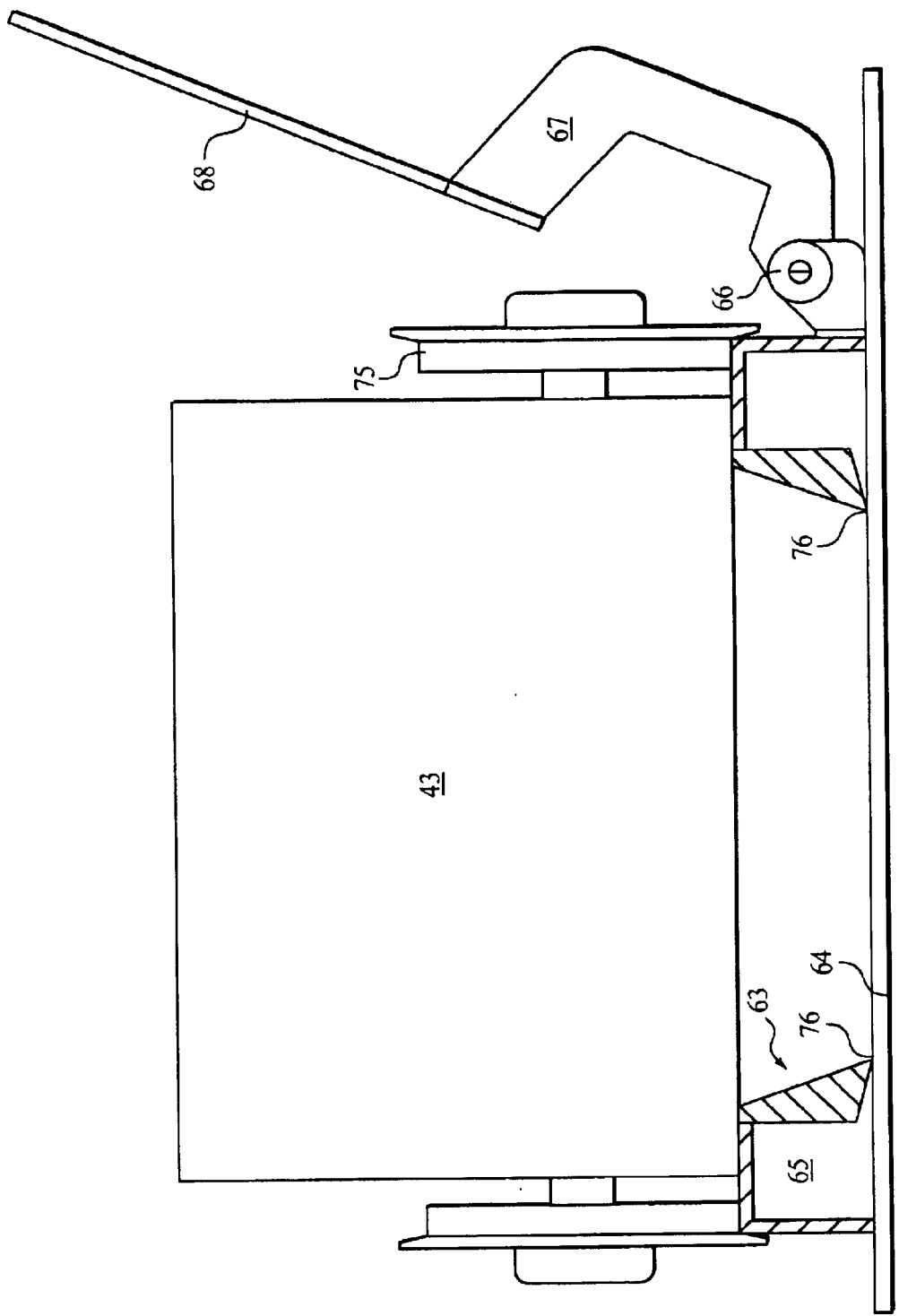
FIG. 8 shows the document support according to FIG. 7 with the transport means positioned on top.
Figure 9:
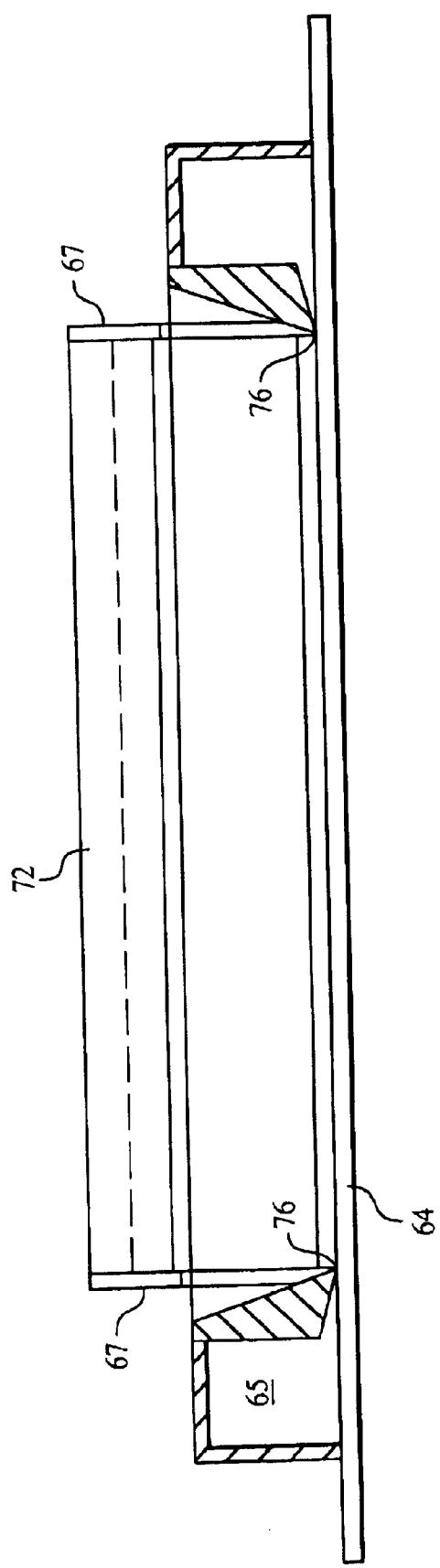
FIG. 9 is a sectional view of the document support with the inserted document and the glass panel placed on top.

This device comprises a holding magazine 40, which is shown in FIG. 5 on a larger scale; a deposit magazine 41; and a document support 42, which is shown in FIGS. 7 to 9 in greater detail. As shown in FIGS. 4 and 5, a transport means for the documents to be processed is positioned above holding magazine 40 and generally denoted by the reference numeral 43.

Holding magazine 40 is located in the upper zone of a housing 44 so that the side parts of holding magazine 40 are double-walled and that the bottom of the magazine is double-walled as well. The slot-shaped openings 46 are located in the inner side walls 45, whereas the inner bottom of holding magazine 40 forms a closed surface. An opening 47 is located laterally next to holding magazine 40 in the top side of housing 44. Opening 47 is separated from holding magazine 40 by means of a partition wall 48 not extending all the way down to the bottom of housing 44.

As shown in FIGS. 4 and 5, a transport means 43 that can be displaced sideways is positioned above holding magazine 40. Transport means 43 has a housing 49, which is divided in the two part areas 51 and 52 by means of a partition wall 50. Larger part area 52 is located directly above holding magazine 40 and has the suction openings 54, which are arranged in the form of a matrix in the bottom area 53. An opening 55 is provided in bottom part 53 of the part area 51. When in the position shown, opening 55 is aligned with opening 47. A suction blower 56 is arranged in the partition wall 50. Blower 56 exhausts air from part area 52 and thus through suction openings 54 from the holding magazine, and blows the exhausted air into housing 44 via opening 55 and opening 47.

The transport means 43 or housing 49 can be displaced sideways on the rails 57 by means of the wheels 75. The wheels 75 and the rails 57 are arranged in this connection in such a way that an air gap remains available between the top side of the housing 44 and the bottom area 53 of the transport means 43.

Another suction blower 59 is arranged in housing 44, namely in the side wall 58. Additional suction blower 59 evacuates the interior of housing 44. In the present exemplified embodiment, the aspirated air is blown through an opening in the housing 60 of the deposit magazine 41 and into deposit magazine 41. Deposit magazine 41 is located in the lower area of housing 60, notably at the end of a curved guide means 61, which starts at the top side of housing 60. Provision is made there for an opening 62. The dimensions of opening 62 approximately correspond with the dimensions of a document to be processed.

The curved guide means 61 is designed in such a way that a document ejected from the transport means 43 and dropped into the opening 62 is turned on its way by 180° as it is being transported up to the deposit magazine 41.

The document support 42, which is described in greater detail with the help of FIGS. 7 to 9, is located on the side of deposit magazine 41 that is facing away from holding magazine 40. Document support 42 substantially comprises a rectangular framework 63, which is arranged on a transparent substrate 64 below which an illuminating device is arranged. The framework consists of hollow profiles, whereby the inner profile sides pointing at one another are slanted, so that a funnel-like structure is obtained which serves the purpose of self-centering of the documents ejected by transport means 43. The cavities 65 of the hollow profiles are communicatively connected with the atmosphere via the slot-like openings 76 located between the lower edge of the inner profile sides and substrate 64. Cavities 65 can be evacuated by means of a suction device not shown.

On the rear side of the framework 63, a glass panel 68 is arranged on a rotary bearing 66 by means of the U-shaped cantilevered arms 67 and secured on the front end of the cantilevered arms.

On one of the cantilevered arms, provision is made for a lug 69 against which a pin 71 secured on the shaft of an electric motor 70 can be driven, so that the glass panel 68 can be pivoted from a covering position (the glass panel is positioned within the framework on the document positioned underneath it—see FIG. 9) up into the position shown in FIG. 8.

FIG. 8 shows the situation in which the transport means 43 with a document clinging to it by suction has been driven into the position above the document holder 42. FIG. 8 also shows that the hollow profiles serve at the same time as guide rails for the wheels of the transport means 43.

The glass panel 68 is preferably secured on the cantilevered arm 67 by means of ribbons which are adhesive on both sides. The adhesive ribbon is elastic and acts as an additional bearing permitting a lesser amount of angular play. In this way, and also due to adequate tolerance in the bearings (bearing and shaft of the geared motor), the glass panel is provided with adequate clearance for flatly resting on the document in any case.

FIG. 9 shows that the cantilevered arms 67 are connected with each other by means of one or also two crossties.

The operational sequence of this device is described as follows:

A stack (not shown) of documents to be processed, for example digitized such as microfiches or microfilm jackets is contained in the holding magazine 40. The transport means 43 is driven on top of the holding magazine 40 as shown in FIGS. 4 and 5. The glass panel 68 is located in the position shown in FIG. 8.

Suction blower 56 is now started. This causes a document to be removed by suction from holding magazine 40 and to be attached to bottom plate 53 of housing 49, whereby such document closes suction openings 54. This actuates a microswitch 73 located in bottom plate 53, which triggers a signal by which suction blower 59 is started. Suction blower 59 evacuates housing 44, whereby the remaining stack is retained in holding magazine 40 due to slot-like openings 46 in the side walls of the holding magazine, and due to the gap present between transport means 43 and holding magazine 40. This assures that only one document will adhere to transport means 43.

However, it is possible also to dispense with microswitch 73 and to make provision instead for a microswitch 74 located in the flow path of the air blown by suction blower 56 through the openings 55 and 47. Microswitch 74 is deflected by the flow of air against the force of a spring. Once a document has been picked up by suction, i.e. once suction openings 54 have been closed, the flow of air is interrupted and switch 74 pivots back into the starting position. This generates a signal that actuates suction blower 59 as well.

A third possibility is to make provision for a defined time factor defining a time span after which the transport means 43 starts to drive in the direction of the document holder 42 after the suction activity of the suction blower 56 has started.

The transport means 43, with the document adhering to its underside, is driven across the housing 60 of the deposit magazine 41 until it is positioned directly above the document support 42 (see FIG. 8). The suction blower 56 is then shut off and the document drops into the document support 42.

In the embodiment of the variation comprising the microswitch 73, the spring force of the microswitch 73 serves for supporting said ejection movement.

Transport means 43 drives in the direction of housing 60 of deposit magazine 41. The glass panel 68 is placed on the document. Now, the digitizing process takes place after the document has been optionally attached by suction to substrate 64 due to the evacuation of cavities 65 of framework 63. After the digitizing process has been completed, glass panel 68 pivots again upwards, whereby the document remains attached to substrate 64 due to the still-prevailing vacuum. The vacuum is subsequently cancelled; transport means 43 drives on top of document support 42, picks up the digitized document by suction, and drives back and on top of housing 60 of deposit magazine 41, and, after blower 56 has been shut off, drops the document through opening 52 and via guide 61 into deposit magazine 41. Thereafter, transport means 43 drives again on top of holding magazine 40 and the operational sequence described above is repeated again.

What is claimed is:

1. A method for automatically transporting documents for processing by and removal from a digitizing device comprising the steps of:
   (a) providing a stack of documents comprising a top document and a plurality of lower documents in a holding magazine;
   (b) removing the top document from the plurality of lower documents in the stack contained in the holding magazine by applying suction in a first direction to lift the top document to a level corresponding to a level of a document support and applying suction in a second direction opposite to said first direction to retain the plurality of lower documents in the holding magazine;
   (c) transporting the top document laterally to the document support;
   (d) terminating the suction applied to the top document to deposit the top document on the document support;
   (e) subjecting the top document to a digitizing process;
   (f) following step (e), applying a suction to engage the top document; and
   (g) transporting the top document to a deposit magazine.

2. The method according to claim 1, further comprising the step of using a sensor to determine that the top document has been lifted by suction from the holding magazine and to start transporting of the top document to the document support only after the top document has been lifted.

3. The method according to claim 1, further comprising the step of covering the top document deposited on the document support with a glass panel.

4. The method according to claim 1, further comprising the step of applying a spring force to the top document to repel the document toward the document support upon termination of the suction applied to the top document.

5. The method according to claim 1, wherein the top document is lifted by suction from the holding magazine by a transport means movable between the holding magazine and the document support, deposited on the document support, lifted again by suction by said transport means following completion of the digitizing process in step (e), and then dropped into the deposit magazine during return of the transport means to the holding magazine.

6. The method according to claim 1, wherein the top document is lifted by suction from the holding magazine by a first transport means, deposited on the document support, lifted again by suction by a second transport means movable between the document support and the deposit magazine following completion of the digitizing process in step (e), and then deposited into the deposit magazine by said second transport means.

7. The method according to claim 6, wherein said second transport means during movement to the deposit magazine rotates the top document in a plane extending perpendicular to the plane of the document support by about 150° counterclockwise, or by about 210° clockwise, relative to the plane of the document support.

8. The method according to claim 1, further comprising the step of guiding the top document into the deposit magazine so that the top document is turned by 180°.

9. The method according to claim 1, wherein before suction is applied to the top document in the holding magazine, compressed air is admitted into a bottom portion of the holding magazine to lift the stack of documents, and after suction is applied to lift the top document from the plurality of lower documents contained in the stack, suction is applied to retain the plurality of lower documents in the holding magazine.

10. A device for automatically transporting documents for processing by and removal from a digitizing device, comprising:
(a) a holding magazine for a stack of documents to be processed, said holding magazine comprising a container dimensioned to receive the stack of documents having a double-walled bottom part and double-walled side parts extending from said bottom part to form a suction evacuation cavity, said side parts having inner walls comprising openings in said inner walls;
(b) a document support;
(c) a deposit magazine;
(d) means for transporting a document picked up by suction from the holding magazine to the document support, said means for transporting a document picked up by suction from the holding magazine to the document support comprising a planar board comprising suction openings connected to a suction device for evacuation of the suction evacuation cavity, said suction openings being adapted to be completely covered by the document picked up by suction;
(e) means for transporting the document from the document support to the deposit magazine; and
(f) means for forming gap areas between the board and the side parts.

11. The device according to claim 10, wherein said planar board is part of a housing displaceable on guides, said housing being divided by a partition into first and second part areas, said first part area being arranged above the suction openings, said second part area containing a suction blower adapted for evacuation of said first part area, said second part area having an opening aligned with an opening in the holding magazine so that air evacuated from the first part area is received in the double-walled bottom part of the holding magazine.

12. The device according to claim 11, further comprising a microswitch actuated by air flow from the suction blower.

13. The device according to claim 11, wherein said housing has a bottom, said holding magazine is arranged on said bottom and has an opening on an upper side dimensioned to receive a document picked up by suction, and wherein said device further comprises a guide extending from said opening to the deposit magazine and having a path designed to turn by 180° a document received in said opening.

14. The device according to claim 11, wherein the deposit magazine is arranged between the holding magazine and the document support.

15. The device according to claim 10, further comprising a suction blower arranged in the double-walled bottom part of the holding magazine, said suction blower having a blower side projecting from one of the side parts of the holding magazine.

16. The device according to claim 10, further comprising a downwardly projecting microswitch arranged in the planar board.

17. The device according to claim 10, wherein said document support comprises:
(a) a frame having dimensions corresponding with a document transported to said document support; and
(b) a glass panel articulated on said frame adapted to cover the document transported to said document support and deposited on said document support.

18. The device according to claim 17, further comprising two U-shaped cantilevered arms secured to said glass panel at fastening points and pivotable from a covering position into a release position by means of an electric motor.

19. The device according to claim 17, further comprising a double-sided adhesive ribbon securing the glass panel on the cantilever arms.

20. The device according to claim 18, wherein said cantilevered arms are articulated near said fastening points to permit a play of a few angular degrees.

21. The device according to claim 17, wherein said frame comprises a plurality of hollow profiles having inner profile walls with openings at ends of said document support and cavities adapted for evacuation.

22. The device according to claim 10, wherein the deposit support is arranged between the holding magazine and the deposit magazine.

23. The device according to claim 22, wherein said means for transporting the document from the document support to the deposit magazine is separate from said means for transporting a document picked up by suction from the holding magazine to the document support, said means for transporting the document from the document support to the deposit magazine being pivotable in a plane extending perpendicular to a plane of the document support by an angle of about 150° counterclockwise, or by about 210° clockwise, relative to the plane of the document support.

24. The device according to claim 23, further comprising slots arranged in a guide for swiveling movements and connecting said suction opening with said suction device, said slots opening during the swiveling movement.

25. The device according to claim 10, further comprising closable openings located above said suction opening for establishing a connection with the atmosphere.

* * * * *

UNITED STATES PATENT AND TRADEMARK OFFICE
CERTIFICATE OF CORRECTION

PATENT NO. : 6,742,779 B2
DATED : June 1, 2004
INVENTOR(S) : Schreier et al.

It is certified that error appears in the above-identified patent and that said Letters Patent is hereby corrected as shown below:

Column 12,
Line 27, "17" should be -- 18 --.

Signed and Sealed this

Thirty-first Day of August, 2004

JON W. DUDAS
*Director of the United States Patent and Trademark Office*